US008782355B1

(12) United States Patent
Jain (10) Patent No.: US 8,782,355 B1
(45) Date of Patent: Jul. 15, 2014

(54) METHOD AND APPARATUS TO PREVENT FIFO OVERFLOW AND UNDERFLOW BY ADJUSTING ONE OF A WRITE RATE AND A READ RATE

(75) Inventor: Kapil Jain, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 322 days.

(21) Appl. No.: 13/298,876

(22) Filed: Nov. 17, 2011

Related U.S. Application Data (60) Provisional application No. 61/416,254, filed on Nov. 22, 2010.

(51) Int. Cl.
*G06F 12/00* (2006.01)
*G06F 13/00* (2006.01)
(52) U.S. Cl.
USPC .......................................... 711/154; 711/167
(58) Field of Classification Search
None
See application file for complete search history.

(56) References Cited

U.S. PATENT DOCUMENTS

| 5,323,272 | A  | * | 6/1994  | Klingler  | 360/8   |
|-----------|----|---|---------|-----------|---------|
| 5,452,010 | A  | * | 9/1995  | Doornink  | 348/497 |
| 6,519,722 | B1 | * | 2/2003  | Wiggins   | 714/707 |
| 7,042,911 | B2 | * | 5/2006  | Toshitani | 370/503 |
| 7,450,678 | B2 | * | 11/2008 | Nishioka  | 375/372 |
| 7,599,456 | B1 | * | 10/2009 | Chi et al.| 375/354 |

* cited by examiner

*Primary Examiner* — Sanjiv Shah
*Assistant Examiner* — Glenn Gossage (57) ABSTRACT

An apparatus and method for preventing FIFO overflow and underflow are disclosed. The apparatus includes a memory block, a write address control configured to generate a write address for writing data to the memory block at a write rate, a read address control configured to generate a read address for reading data out of the memory block at a read rate, and a management controller configured to adjust one of the write rate and the read rate to track the other rate based on a difference between the write address and the read address, for example by dynamically adjusting the read rate to the write rate. A direction in which the difference changes may also be detected. The memory block may be configured as a dual-port memory block. An audio apparatus including a digital audio input and output and a buffer is also disclosed.

14 Claims, 5 Drawing Sheets

METHOD AND APPARATUS TO PREVENT FIFO OVERFLOW AND UNDERFLOW BY ADJUSTING ONE OF A WRITE RATE AND A READ RATE

INCORPORATION BY REFERENCE

This present disclosure claims the benefit of U.S. Provisional Application No. 61/416,254, "Dynamic Control of FIFO to Prevent Overflow and Underflow" filed on Nov. 22, 2010, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In an electronic system, a first-in-first-out (FIFO) buffer can be used to transmit data from a first domain to a second domain of the electronic system. In an example, data from the first domain is pushed into the FIFO buffer, and data in the FIFO buffer pops out and goes to the second domain. The FIFO buffer may have overflow or underflow when the push rate and the pop rate do not match.

SUMMARY

Aspects of the disclosure provide an apparatus. The apparatus includes a memory block, a write address control, a read address control and a management controller. The write address control is configured to generate a write address for writing data to the memory block at a write rate. The read address control is configured to generate read address for reading data out of the memory block at a read rate. The management controller is configured to adjust one of the write rate and the read rate to track the other rate based on a difference between the write address and the read address.

According to an aspect of the disclosure, the management controller is configured to dynamically adjust the read rate to converge the read rate to the write rate.

In an embodiment, the management controller is configured to detect a direction in which the difference between the write address and the read address changes, and adjust the one of the write rate and the read rate when the direction remains the same. Further, in an example, the management controller is configured to bound a rate adjustment to the one of the write rate and the read rate between a maximum value and a minimum value. In addition, in an example, the management controller is configured to make a rate adjustment to the one of the write rate and the read rate as a function of the difference between the write address and the read address. Also, in an example, the management controller is configured to adjust the one of the write rate and the read rate when the difference between the write address and the read address is out of a predetermined range.

According to an aspect of the disclosure, the memory block is configured as a dual-port memory block. Further, in an example, the memory block includes a plurality of memory units organized in a circular sequential order. Then, the write address control module is configured to generate a write pointer following the circular sequential order, and the read address control module is configured to generate a read pointer following the circular sequential order.

Aspects of the disclosure provide a method. The method includes receiving a write address generated at a write rate and a read address generated at a read rate. The write address and the read address are used for accessing a memory block in a first-in-first-out (FIFO) manner. Then, the method includes adjusting one of the write rate and the read rate to track the other rate based on a difference between the write address and the read address. In an example, the method includes dynamically adjusting the read rate to converge the read rate to the write rate.

Aspects of the disclosure provide an audio apparatus. The audio apparatus includes a first-in-first-out (FIFO) buffer, a digital audio input and a digital audio output. The digital audio input is configured to push input data of a first rate into the FIFO. The digital audio output is configured to operate on output data popped out from the FIFO buffer based on a clock signal. The FIFO buffer includes a memory block, a write pointer generator, a read pointer generator and a management controller. The memory block includes a plurality of memory units organized in a circular sequential order. The write pointer generator is configured to generate a write pointer following the circular sequential order at the first rate of the input data. The read pointer generator is configured to generate a read pointer following the circuit sequential order at a second rate based on the clock signal. The management controller is configured to adjust the second rate to track the first rate based on a difference between the write pointer and the read pointer.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
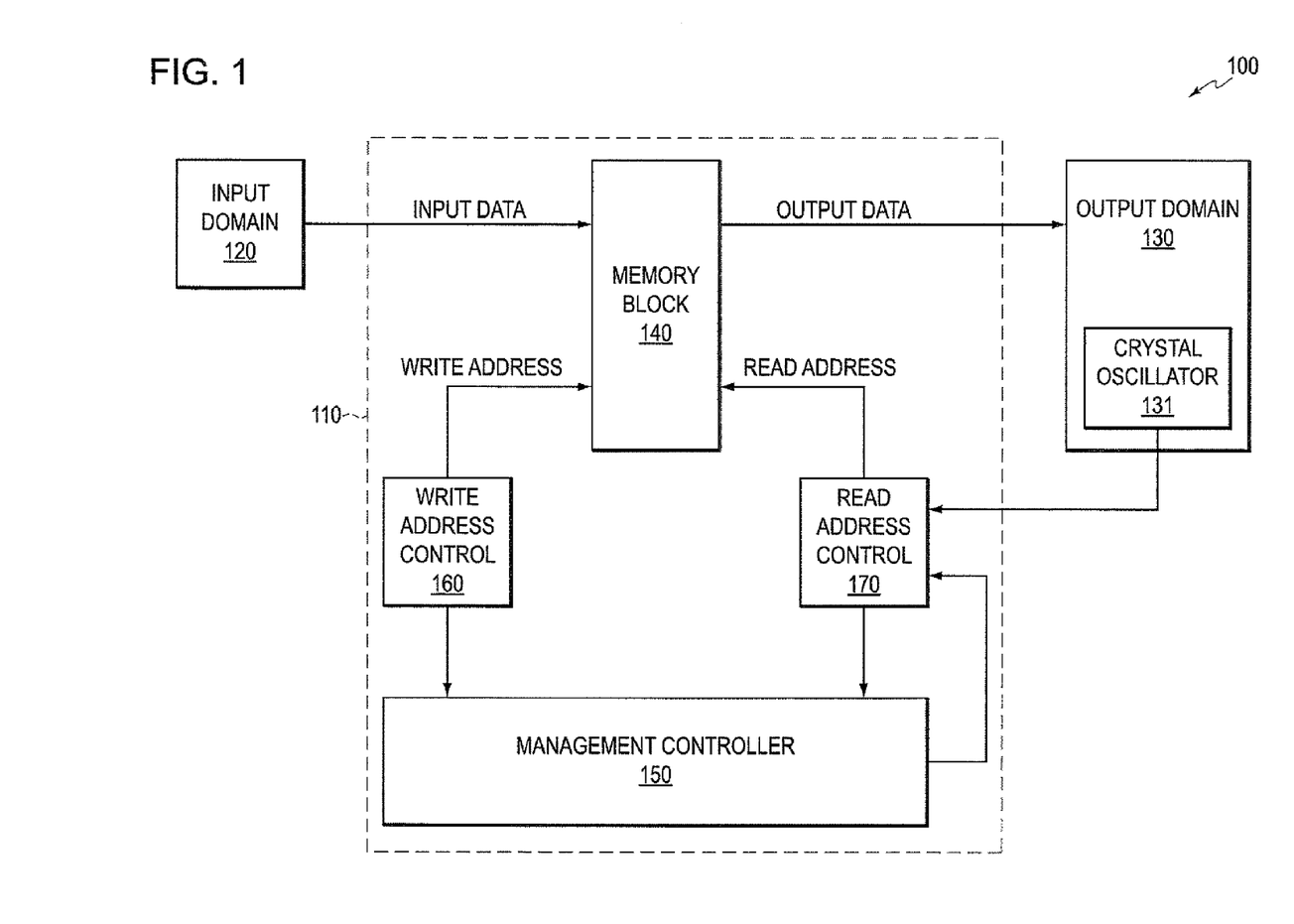
FIG. 1 shows a block diagram of an example system 100 according to an embodiment of the disclosure.

FIG. 1 shows a block diagram of a system 100 according to an embodiment of the disclosure. The system 100 includes a buffer 110, an input domain 120, and an output domain 130. The input domain 120 pushes input data into the buffer 110, and output data is popped out of the buffer 110, and goes to the output domain 130. These elements are coupled together as shown in FIG. 1.

The buffer 110 includes a memory block (e.g., first-in-first-out memory block) 140, a write address control 160, a read address control 170, and a management controller 150. The memory block 140 can be implemented using any suitable memory devices, such as random access memory (RAM), and the like. The write address control 160 generates the write address to write the input data into the memory block 140, and the read address control 170 generates the read address to read the output data from the memory block 140. The management controller 150 receives write address information and read address information, and dynamically controls one of the address controls, such as the read address control 170, to prevent underflow and overflow.

In an embodiment, the memory block 140 is implemented using random access memory (RAM) cells. In an example, a RAM cell stores a binary value. In an embodiment, the memory block 140 is configured to operate in a first-in-first-out (FIFO) manner. In an example, the memory block 140 includes a plurality of memory units logically arranged in a circular sequential order. Each memory unit includes a plurality of RAM cells. The write address control 160 generates a write address corresponding to a memory unit for writing the input data following the circular sequential order, and the read address control 170 generates a read address corresponding to a memory unit for reading the output data following the circular sequential order.

In an embodiment, the buffer 110 is configured to operate in a FIFO manner. In an example, the input domain 120 provides the input data to the buffer 110 in the form of a train of input data units, and the output domain 130 reads the output data from the buffer 110 in the form of a train of output data units. The train of input data units is written to the buffer 110 at a write rate, and the train of output data units is read from the buffer 110 at a read rate. The data unit first written to the buffer 110 is first read out.

According to an embodiment of the disclosure, the input domain 120 and the output domain 130 use two different clocks, such as two different crystal clocks originated from two different crystal oscillators. In an example, the write rate is determined based on a first crystal oscillator used in the input domain 120, and the read rate is determined based on a second crystal oscillator used in the output domain 130. The two different crystal oscillators may cause a mismatch in the write rate of the input data and the read rate of the output data. The mismatch further causes overflow or underflow in the memory block 140. For example, when the write rate is larger than the read rate, the memory block 140 may be full and overflow happens. On the other hand, when the write rate is smaller than the read rate, the memory block 140 may be empty and underflow happens.

According to an aspect of the disclosure, the management controller 150 is configured to adjust one of the read rate and the write rate to track the other to prevent overflow and underflow.

In an embodiment, the read rate is adjustable. In an example, the output domain 130 includes a local crystal oscillator 131 that provides a reference clock to the read address control 170. The read address control 170 includes an adjustable parameter, such as a ratio, and the like, that is used to adjust the read rate. For example, the read address control 170 generates the read address at the read rate that is the ratio of the frequency of the reference clock. Thus, an adjustment to the ratio adjusts the read rate.

The management controller 150 receives write address information from the write address control 160 and read address information from the read address control 170 and detects possible overflow or underflow based on the write address information and read address information. When overflow or underflow is possible, the management controller 150 determines adjustment to the adjustable parameter in the read address control 170, such as the ratio of the frequency, to avoid overflow and underflow.

In an embodiment, the adjustment is dynamically determined based on the write and read address information. For example, the management controller 150 repetitively receives the write address and the read address during operation, calculates a difference between the write address and the read address, compares the difference to a range, and adjusts the adjustable parameter based on the difference. For example, when the difference is far away from a desired range, the controller 140 applies a relatively large adjustment to the ratio of the frequency to pull the difference in the direction of the range faster; and when the difference is close to the range, the controller applies a relatively small adjustment to the ratio of the frequency to pull the difference in the direction of the range slower. In an example, the dynamic adjustment causes the read rate to converge to the write rate in a quick and stable manner.

It is noted that, in another embodiment, when the write rate is adjustable, the management controller 150 can adjust the write rate to track the read rate to avoid overflow and underflow in a similar manner as the read rate adjustment.

It is noted that, in an example, the system 100 can be any suitable system in which a buffer crosses two domains that use clocks originated from different clock sources, such as two different crystal oscillators, and the like. It is noted that, in another example, the buffer is used to cross two domains using clocks that are originated from a same clock source but have different long term jitter.

Figure 2:
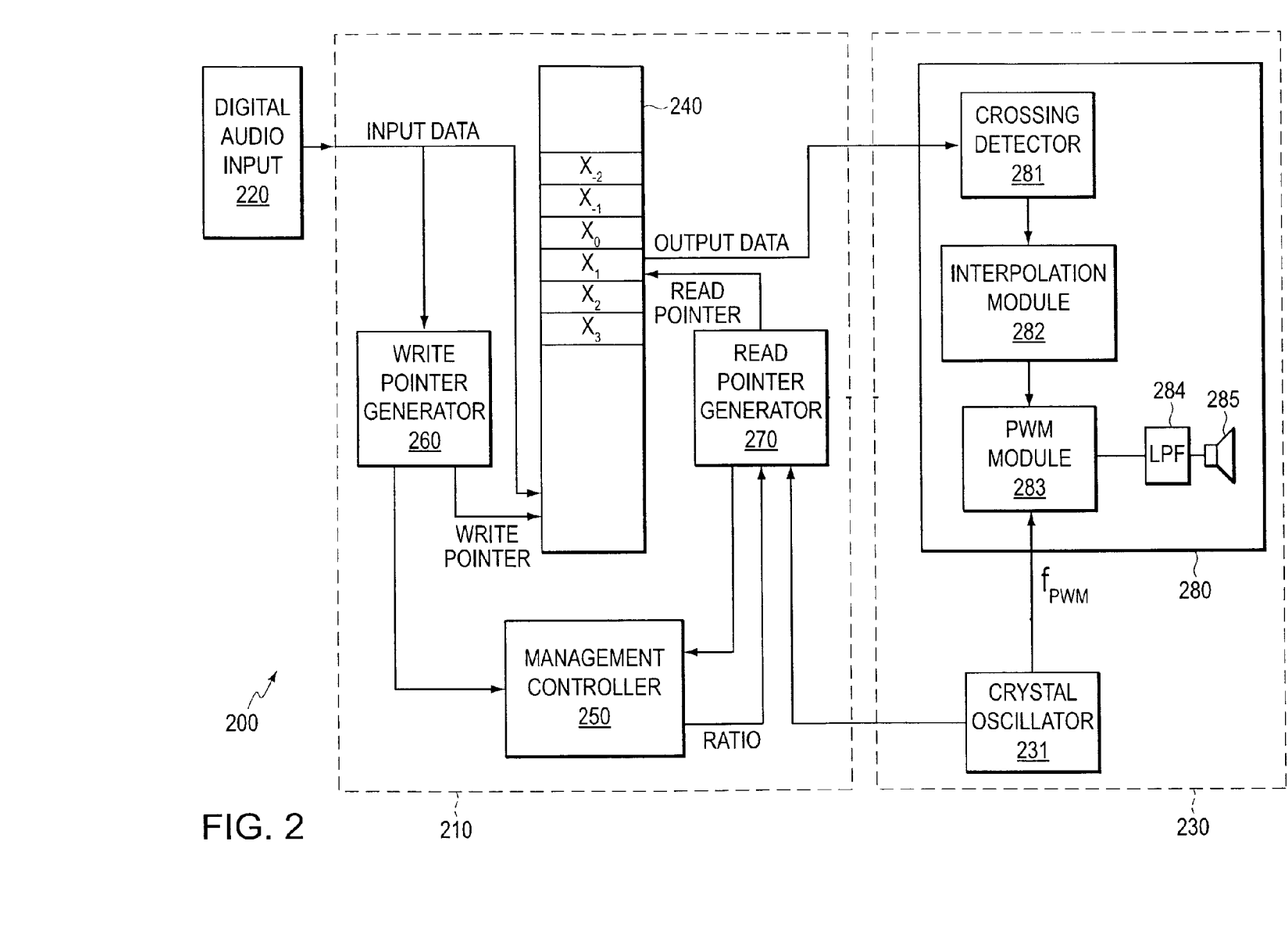
FIG. 2 shows a block diagram of at an example audio system 200 according to an embodiment of the disclosure.

FIG. 2 shows a block diagram of an audio system 200 according to an embodiment of the disclosure. The audio system 200 includes a FIFO buffer 210, a digital audio input 220, and an audio output 230. The digital audio input 220 pushes input data into the FIFO buffer 210, and output data is popped out of the FIFO buffer 210, and goes to the audio output 230. These elements are coupled together as shown in FIG. 2.

The digital audio input 220 includes any suitable devices to generate input data. In an example, the digital audio input 220 includes a digital audio equipment configured to capture audio waves, sample the audio waves at a suitable sampling rate (a such as 32 KHz, 44.1 KHz, 48 KHz, and the like, based on a crystal oscillator of the digital audio equipment, and convert the sampled audio waves into digital audio data. In addition, in an embodiment, the digital audio input 220 includes an up-sampler (not shown) configured to up-sample the digital audio data by N times (N is a positive integer) to generate the input data, for example. Then, the digital audio input 220 provides the input data to push into the FIFO buffer 210 at a rate of $N \times f_s$, for example.

In another example, the digital audio input 220 includes an optical pick-up unit (not shown) configured to read the digital audio data from a compact disc (CD). In an example, the digital audio data from the CD has a sampling rate of 44.1 KHz. In addition, in an embodiment, the digital audio input 220 includes an up-sampler (not shown) configured to up-sample the digital audio data by N times to generate the input data, for example. Then, the digital audio input 220 provides the input data to push into the FIFO buffer 210 at a sample rate of N×44.1 KHz, for example. It is noted that the CD rate may depend on a crystal oscillator in CD recording equipment (not shown) that records the digital audio data onto the CD.

In another example, the digital audio input 220 includes a digital audio drive (not shown) configured to read the digital audio data from a digital audio tape (DAT). In an example, the digital audio data from the DAT has a sampling rate of 48 KHz. In addition, in an embodiment, the digital audio input 220 includes an up-sampler (not shown) configured to up-sample the digital audio data by N times to generate input data, for example. Thus, the digital audio input 220 provides the input data to push into the FIFO buffer 210 at a sample rate of N×48 KHz, for example. It is noted that the DAT rate may depend on a crystal oscillator in DAT recording equipment that records the digital audio data onto the DAT.

In another example, the digital audio input 220 includes a receiving portion configured to receive the digital audio data from a digital audio radio broadcast. In an example, the digital audio data from the digital audio radio broadcast has a sampling rate of 16 KHz. In addition, in an embodiment, the digital audio input 220 includes an up-sampler (not shown) configured to up-sample the digital audio data by N times to generate input data, for example. Thus, the digital audio input 220 provides the input data to push into the FIFO buffer 210 at a sample rate of N×16 KHz. It is noted that the digital audio broadcast rate may depend on a crystal oscillator in digital audio radio broadcast equipment that broadcasts the digital audio data.

The audio output 230 includes any suitable devices to receive the output data from the FIFO buffer 210, and to generate audio waves in response to the output data. In an embodiment, the audio output 230 includes a class D audio amplifier 280 and a crystal oscillator 231. The crystal oscillator 231 is suitably configured to provide a reference frequency ($f_{PWM}$) to the class D audio amplifier 280 and the FIFO buffer 210.

In an embodiment, the class D audio amplifier 280 includes a crossing detector 281, an interpolation module 282, a Pulse Width Modulation (PWM) module 283, a low pass filter (LPF) 284, and a speaker 285. These elements are coupled together as shown in FIG. 2.

According to an aspect of the disclosure, the crossing detector 281 reads the output data one sample at a time, and detects a crossing of the output data to a reference waveform, such as a triangle waveform, a saw waveform and the like. For example, when a previous sample is larger than the reference waveform and the present sample is smaller than the reference waveform, a crossing is detected. Similarly, when a previous sample is smaller than the reference waveform and the present sample is larger than the reference waveform, a crossing is detected. In an embodiment, the crossing detector 281 is implemented using digital signal processing techniques.

When a crossing is detected, multiple samples are read from the FIFO buffer 210 into the interpolation module 282. The interpolation module 282 uses any suitable interpolation, such as Hermite interpolation, Lagrange interpolation, and the like to detect a phase of the crossing point. In an example, when a crossing is detected at sample $X_1$, six samples $X_2$ to $X_3$ are read from the FIFO buffer 210. The interpolation module 282 uses the six samples to form Hermite interpolation, and detects a relatively accurate phase of the crossing point. In an embodiment, the interpolation module 282 is implemented using digital signal processing techniques.

The detected phase of the crossing point is provided to the PWM module 283. The PWM module 283 generates a pulse train having the reference frequency $f_{PWM}$, and the pulse train is pulse width modulated according to the detected phase by the interpolation module 282. The low pass filter (LPF) 284 is configured to have a pass band that allows low frequency components to pass, such as a band corresponding to sound. The speaker 285 converts filtered electrical signals to sound waves.

The FIFO buffer 210 includes a memory block 240, a write pointer generator 260, a read pointer generator 270, and a management controller 250.

In an embodiment, the memory block 240 is implemented using random access memory (RAM) cells. In an example, a RAM cell stores a binary value. The memory block 240 includes a plurality of memory units logically arranged in a circular sequential order to store samples of the input data. Each memory unit may include a plurality of RAM cells The write pointer generator 260 generates a write pointer pointing to a next memory unit for writing. According to an embodiment of the disclosure, the write pointer generator 260 generates the write pointer at a write rate corresponding to the sample rate of the input data, such as N×$f_s$.

The read pointer generator 270 generates a read pointer pointing to a present memory unit for reading. According to an embodiment of the disclosure, the read pointer generator 260 generates the read pointer at a read rate based on the crystal oscillator 231. In an example, the read rate is based on a ratio (TRatio) and the reference frequency $f_{PWM}$. For example, the read pointer generator 260 generates the read pointer at the read rate of TRatio×$f_{PWM}$.

According to an aspect of the disclosure, the management controller 250 receives the write pointer and the read pointer, and detects possible overflow or underflow based on the write pointer and the read pointer.

In an example, the memory block 240 has 64 memory units. Initially, a difference between the write pointer and read pointer is 32. For example, the read pointer starts at memory unit 0 and the write pointer starts at memory unit 32. The management controller 250 includes a defined range for the difference, such as 32±4.

The management controller 250 computes a difference (A) between the received write pointer and read pointer. In an embodiment, the management controller 250 calculates an average of the difference over a time duration. In an example, the average of difference is calculated using a α filter, as shown in Eq. 1:

$$\mathrm{Out}(n)=\alpha\times\mathrm{In}(n)+(1-\alpha)\times\mathrm{Out}(n-1) \qquad \mathrm{Eq.\ 1}$$

where Out(n) denotes a present average of the difference, α denotes a controllable parameter between 0 and 1, In(n) denotes a present difference of the write pointer and the read pointer, and Out(n−1) denotes a previous average of the difference.

Further, the management controller 250 determines whether to adjust the TRatio. According to an aspect of the disclosure, the management controller 250 adjusts the TRatio in a manner to converge the TRatio and maintain the difference within the range.

In an embodiment, the management controller 250 detects in which direction (dir) the difference of the write pointer and read pointer goes. For example, when the difference of the write pointer and the read pointer goes in the same direction as the previous difference, (e.g., the difference is in the direction of increase, and the previous difference is in the direction of increase), the management controller 250 makes adjustment to the TRatio; and when the difference of the write pointer and the read pointer changes direction from the previous difference, (e.g., the difference is in the direction of decrease, and the previous difference is in the direction of increase), the management controller 250 maintains the same TRatio.

Further, the management controller 250 determines an adjustment to the TRatio based on the difference. For example, when the difference is far away from the range, the management controller 250 determines a relatively larger adjustment to the TRatio; and when the difference is close to the range, the management controller 250 determines a relatively smaller adjustment to the TRatio.

In addition, in an embodiment, the management controller 250 bounds the adjustment based on a maximum adjustment and a minimum adjustment.

Then, the management controller 250 calculates the new TRatio, and provides the new TRatio to the read pointer generator 270 to generate the read pointer at the read rate of new TRatio×$f_{PWM}$.

Figure 3:
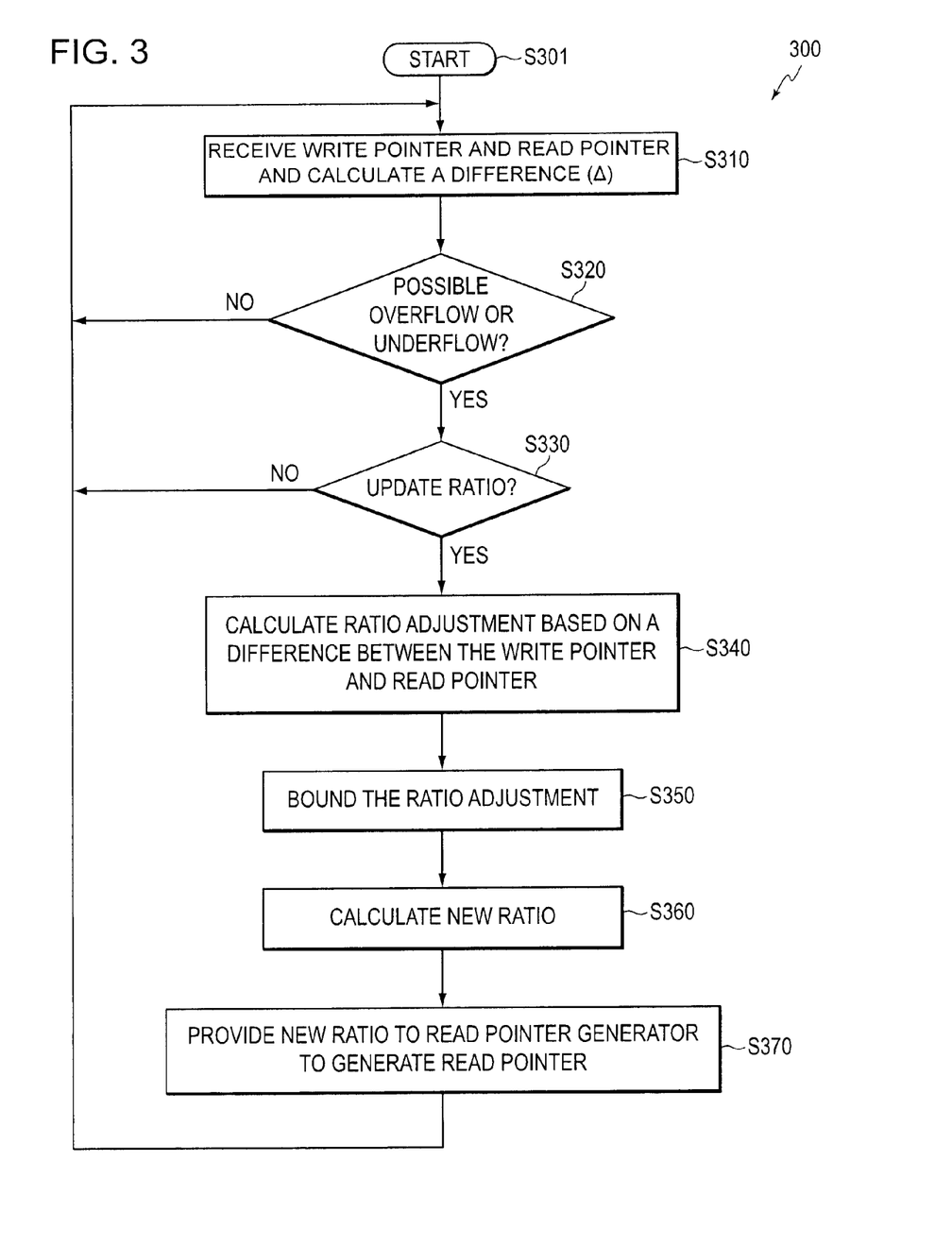
FIG. 3 shows a flow chart outlining an example process 300 according to an embodiment of the disclosure.

FIG. 3 shows a flow chart outlining an example process 300 performed by the management controller 250 according to an embodiment of the disclosure. According to an embodiment of the disclosure, the management controller 250 is implemented as a processor executing software code. A dynamic TRatio adjustment algorithm is then implemented in software code. The processor then executes the software code for the dynamic TRatio adjustment algorithm to perform the process 300. The process starts at S301 and proceeds to S310.

At S310, the management controller 250 receives a write pointer from the write pointer generator 260 and receives a read pointer from the read pointer generator 270. In an embodiment, the management controller 250 calculates a difference (Δ) between the write pointer (wr_pointer) and the read pointer (rd_pointer). Further, in an example, the management controller 250 calculates an average of the difference.

Following is two code examples for S310.
Code Example A: Δ=wr_pointer−rd_pointer;
Code Example B: Δ=average (wr_pointer−rd_pointer, time duration);

At S320, the management controller 250 determines whether overflow and underflow is possible. In an embodiment, the management controller 250 determines whether the difference is in a range. When the difference is in the range, the process returns to S310; otherwise, the process proceeds to S330.

According to an embodiment of disclosure, there are four possible scenarios A-D for overflow and underflow. In scenario A, the FIFO buffer 210 has faster write/slower read, and overflow is possible when Δ is positive and out of the range. In scenario B, the FIFO buffer 210 has slower write/faster read, underflow is possible when Δ is positive and out of the range. In scenario C, the FIFO buffer 210 has faster write/slower read, overflow is possible when Δ is negative and out of the range. In scenario D, the FIFO buffer 210 has slower write/faster read, underflow is possible when Δ is negative and out of the range.

Following is a code example for S320. In this example, the FIFO buffer 210 has 64 memory units, and the range is 32±4.
Code Example:
Set limit=overflow_limit=32+4;
If (|Δ|>Limit) && sign(Δ)==1) //A
update_TRatio=1;
   Polarity=1;
Set limit=underflow_limit=32−4;
If ((id 1<Limit) && sign(Δ)==1) //B
update_TRatio=1;
Polarity=−1;
Set limit=underflow_limit=32−4;
If ((|Δ|<Limit) && sign(Δ)==−1) //C
update_TRatio=1;
Polarity=1;
Set limit=overflow_limit=32+4;
If (|Δ|>Limit) && sign(Δ)==−1) //D
update_TRatio=1;
Polarity=−1;

At S330, the management controller 250 determines whether TRatio needs to be updated. In an embodiment, the management controller 250 detects a direction (dir) in which the difference goes, such as an increase direction and a decrease direction. When the difference has a same direction as a previous direction (prev_dir), the management controller 250 determines to adjust the TRatio, and the process proceeds to S340; otherwise, the management controller 250 determines to maintain the TRatio, and the process returns to S310.

Following is a code example for S330.
Code Example:
Initialize final update_Tratio, 0);
Initialize (prev_polarity, 0);
If (update_Tratio==1)
If (polarity~=prev_polarity)
   final_update_TRatio=1;
   prev_dir=Polarity;
   prev_Δ=Δ;
else
   dir=sign(Δ−prev_Δ);
   if (dir~=prev_dir)
      final_update_TRatio=0;
   else
      final_update_TRatio=1;
      prev_dir=dir;
      prev_Δ=Δ;
   end
end
prev_Polarity=Polarity;
end At S340, the management controller 250 calculates an adjustment ($TR_{adj}$) based on the difference. For example, when the difference is far away from the range, the management controller 250 determines a relatively larger adjustment to the Tratio to cause the Tratio to converge to a convergence value faster; and when the difference is close to the rang; the management controller 250 determines a relatively smaller adjustment to the Tratio to cause the Tratio to converge to the convergence value slower but more stably. In an example, the dynamic adjustment to the Tratio achieves faster and more stable convergence to the convergence value.

Following is a code example for S340.
Code Example:
If (finalupdate_TRatio==1)
$TR_{adj}$=polarity/($2^{(27-sign(\Delta) \times polarity \times (|\Delta|-32))}$)

At S350, the management controller 250 bounds the adjustment based on a maximum value, such as $\frac{1}{2}^{10}$, and a minimum value, such as $\frac{1}{2}^{22}$.

Following is a code example for 5350.
Code Example:
$TR_{adj}$=maximum($\frac{1}{2}^{22}$, $TR_{adj}$)
$TR_{adj}$=minimum ($\frac{1}{2}^{10}$, $TR_{adj}$)

At S360, the management controller 250 calculates the new TRatio.

Following is a code example for S360.
Code Example:
TRatio=TRatio+$TR_{adj}$

At S370, the management controller 250 provides the new TRatio to the read pointer generator 270 to generate the read pointer according to the new TRatio. Then, the process returns to S310.

It is noted that the code examples are for illustration. The algorithm can be suitably changed. For example, more codes can be added to control the flow of the process 300, to increase readability, and the like. Further, the parameters in the algorithm, such as the number of memory units, the range, the minimum and maximum value, and the like can be suitably changed.

Figure 4:
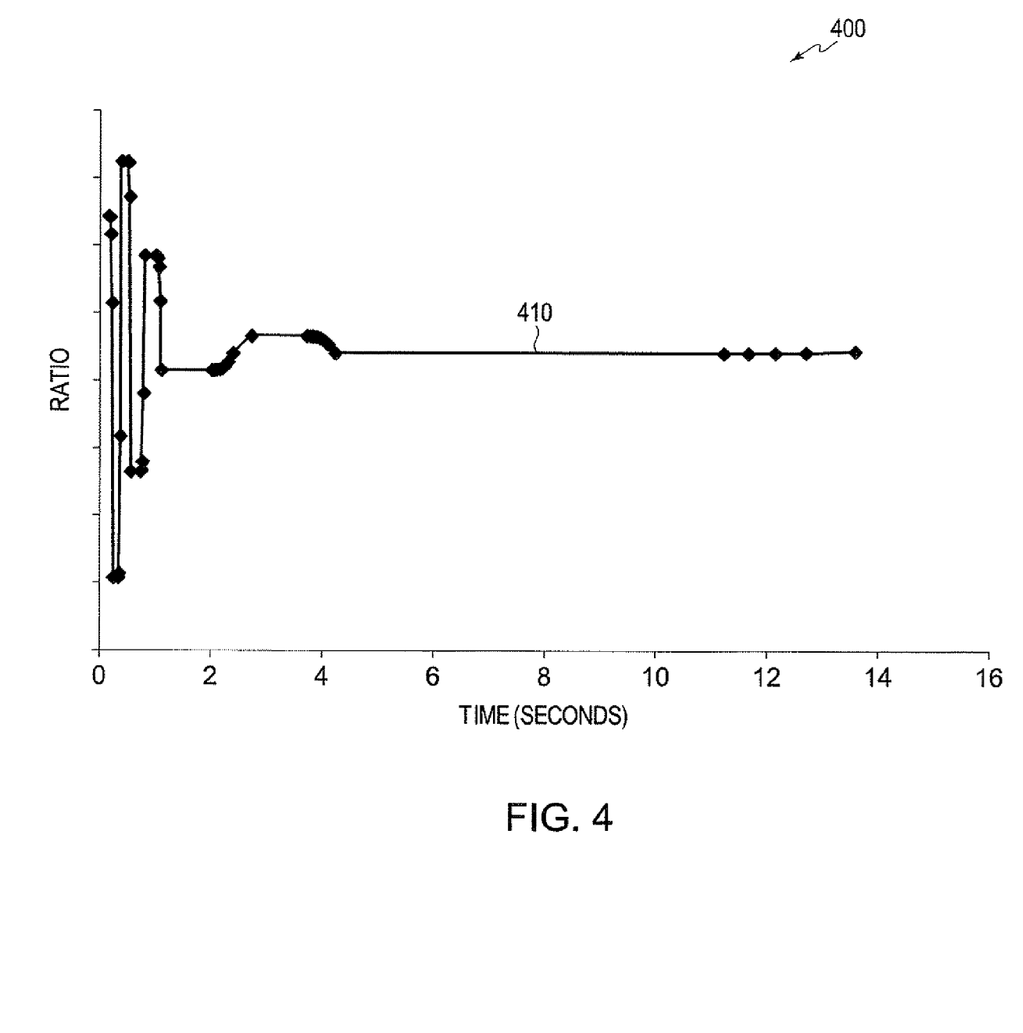
FIG. 4 shows a plot of simulation results according to an embodiment of the disclosure.

FIG. 4 shows a plot 400 of simulation results according to an embodiment of the disclosure. The plot 400 includes a curve 410 that shows TRatio changes with time. As can be seen, the TRatio is dynamically adjusted and the TRatio converges to a relatively stable value. In an embodiment, when the TRatio converges to the stable value, the read rate converges to the write rate.

Figure 5:
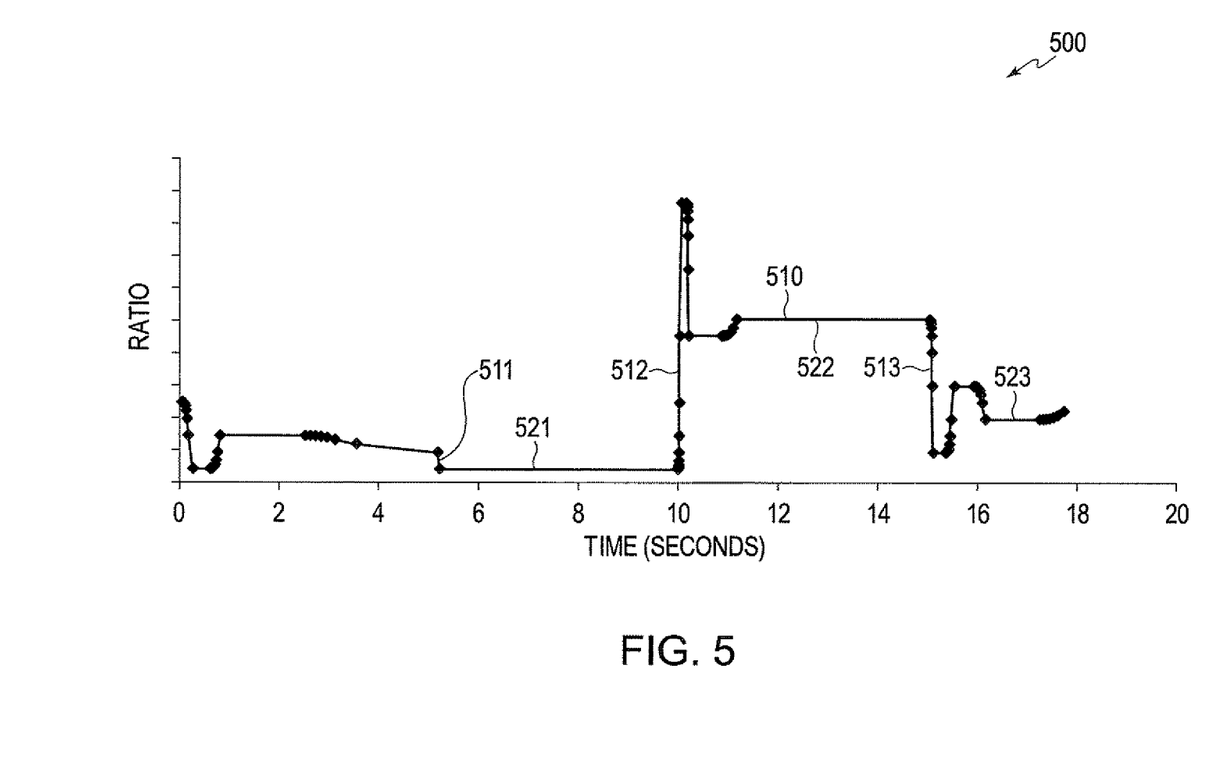
FIG. 5 shows another plot of simulation results according to an embodiment of the disclosure.

FIG. 5 shows a plot 500 of simulation results according to an embodiment of the disclosure. The plot 500 includes a curve 510 that shows TRatio changes with time. In this simulation, the write rate is intentionally changed at 511, 512 and 513. As can be seen by 521, 522 and 523, the TRatio is dynamically adjusted in response to the write rate changes, and the TRatio converges to relatively stable values in a time duration. In an embodiment, when the TRatio converges to the stable value, the read rate converges to the write rate.

Further, according to simulation results, noise due to ratio adjustment is relatively small. For example, changes in signal to noise ratio (SNR) and total harmonic distortion plus noise (THD+N) are within 0.5 dB according to the simulation results.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus, comprising:
a memory block;
a write address control configured to generate a write address for writing data to the memory block at a write rate;
a read address control configured to generate a read address for reading data out of the memory block at a read rate; and
a management controller configured to adjust one of the write rate and the read rate to track the other rate based on a difference between the write address and the read address, compute an average of the difference using a α tiller as $$Out(n) = \alpha \times In(n) + (1-\alpha) \times Out(n-1)$$

where Out(n) denotes the average of the difference, α denotes a controllable parameter between 0 and 1, In(n) denotes a present difference of the write address and the read address, and Out(n−1) denotes a previous average of the difference, and detect, based on Out(n), in which direction the difference between the write address and the read address goes, and adjust the one of the write rate and the read rate when the direction remains the same.

2. The apparatus of claim 1, wherein the management controller is configured to dynamically adjust the read rate to converge the read rate to the write rate.

3. The apparatus of claim 1, wherein the management controller is configured to bound a rate adjustment to the one of the write rate and the read rate between a maximum value and a minimum value.

4. The apparatus of claim 1, wherein the management controller is configured to adjust the one of the write rate and the read rate when the difference between the write address and the read address is out of a defined range.

5. The apparatus of claim 1, wherein the memory block is configured as a dual-port memory block.

6. The apparatus of claim 1, wherein
the memory block includes a plurality of memory units organized in a circular sequential order;
the write address control generates the write address following the circular sequential order; and
the read address control generates the read address following the circular sequential order.

7. A method, comprising:
receiving a write address generated at a write rate and a read address generated at a read rate, the write address and the read address being used for accessing a memory block in a first-in-first-out (FIFO) manner;
adjusting one of the write rate and the read rate to track the other rate based on a difference between the write address and the read address;
computing an average of the difference using a α filter as $$Out(n) = \alpha \times In(n) + (1-\alpha) \times Out(n-1)$$

where Out(n) denotes the average of the difference, α denotes a controllable parameter between 0 and 1, denotes a present difference of the write address and the read address, and Out(n−1) denotes a previous average of the difference:
detecting based on Out(n), in which direction the difference between the write address and the read address goes; and
adjusting the one of write rate and the read rate when the direction remains the same.

8. The method of claim 7, wherein adjusting the one of the write rate and the read rate to track the other rate based on the difference between the write address and the read address further comprises:
dynamically adjusting the read rate to converge the read rate to the write rate.

9. The method of claim 7, further comprising:
bounding a rate adjustment to the one of the write rate and the read rate between a maximum value and a minimum value.

10. The method of claim 7, wherein adjusting the one of the write rate and the read rate to track the other rate based on the difference between the write address and the read address comprises:
adjusting the one of the write rate and the read rate when the difference is out of a defined range.

11. An audio apparatus, comprising:
a digital audio input configured to push input data of a first rate into a buffer;
a digital audio output configured to operate on output data popped out from the buffer based on a clock signal; and
the buffer comprising:
a memory block including a plurality of memory units organized in a circular sequential order;
a write pointer generator configured to generate a write pointer following the circular sequential order at the first rate of the input data;
a read pointer generator configured to generate a read pointer following the circuit sequential order at a second rate based on the clock signal; and
a management controller configured to adjust the second rate to track the first rate based on a difference between the write pointer and the read pointer, compute an average of the difference using a α filter as $$Out(n) = \alpha \times In(n) + (1-\alpha) \times Out(n-1)$$

where Out(n) denotes the average of the difference, α denotes a controllable parameter between 0 and 1, In(n) denotes a present difference of the write pointer and the read pointer, and Out(n−1) denotes a previous average of the difference, detect, based on Out(n), in which direction the difference between the write pointer and the read pointer goes, and adjust the second rate when the direction remains the same.

12. The audio apparatus of claim 11, wherein the management controller is configured to dynamically adjust the second rate to converge the second rate to the first rate.

13. The audio apparatus of claim 11, wherein the management controller is configured to adjust a ratio of the second rate to a frequency of the clock signal.

14. The audio apparatus of claim 11, wherein the digital audio output comprises a class D amplifier.

\* \* \* \* \*